(12) United States Patent
Takeda et al.

(10) Patent No.: US 11,553,514 B2
(45) Date of Patent: Jan. 10, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Huiling Li, Beijing (CN); Lihui Wang, Beijing (CN); Chongning Na, Beijing (CN); Xin Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/982,218

(22) PCT Filed: Mar. 22, 2018

(86) PCT No.: PCT/JP2018/011457
§ 371 (c)(1),
(2) Date: Sep. 18, 2020

(87) PCT Pub. No.: WO2019/180886
PCT Pub. Date: Sep. 26, 2019

(65) Prior Publication Data
US 2021/0029733 A1      Jan. 28, 2021

(51) Int. Cl.
*H04W 4/00* (2018.01)
*H04W 72/12* (2009.01)

(52) U.S. Cl.
CPC .............................. *H04W 72/1289* (2013.01)

(58) Field of Classification Search
CPC ...................... H04W 72/042; H04W 72/0413
(Continued)

(56) References Cited

U.S. PATENT DOCUMENTS 11,139,877 B2 * 10/2021 Lee ...................... H04B 7/0632
2013/0301548 A1 * 11/2013 Etemad ................. H04W 56/00
370/329
(Continued)

FOREIGN PATENT DOCUMENTS

CA    2873611 A1 * 12/2013 ............. H04B 7/024
EP    3079272 B1    10/2016
(Continued)

OTHER PUBLICATIONS

International Search Report issued in Application No. PCT/JP2018/011457, dated Jun. 12, 2018 (4 pages).
(Continued)

*Primary Examiner* — David Q Nguyen
(74) *Attorney, Agent, or Firm* — Osha Bergman Watanabe & Burton LLP

(57) ABSTRACT

To appropriately control UL transmission such as a CSI reporting when performing communication by applying a different configuration from those of legacy LTE systems, a user terminal according to one aspect of the present disclosure includes: a transmission section that transmits one or more UL signals by using an uplink shared channel based on an instruction from a base station; and a control section that controls the transmission assuming that transmission durations of a plurality of UL signals do not overlap in a same symbol, or, when at least part of the transmission durations of the plurality of UL signals overlap in the same symbol, performs control to select and transmit the part of the UL signals.

7 Claims, 14 Drawing Sheets

(58) Field of Classification Search
USPC .................. 370/328, 329, 330, 331, 332
See application file for complete search history.

(56) References Cited

U.S. PATENT DOCUMENTS

| | | | |
|---|---|---|---|
| 2016/0183244 A1* | 6/2016 | Papasakellariou | H04L 5/0057 370/329 |
| 2017/0367046 A1* | 12/2017 | Papasakellariou | H04W 72/0453 |
| 2018/0324793 A1 | 11/2018 | Kim et al. | |
| 2019/0158216 A1* | 5/2019 | Suzuki | H04W 72/042 |
| 2019/0165846 A1* | 5/2019 | Kim | H04W 72/0406 |
| 2019/0165847 A1* | 5/2019 | Kim | H04L 5/0091 |
| 2019/0261354 A1* | 8/2019 | Fakoorian | H04L 1/1671 |
| 2019/0306923 A1* | 10/2019 | Xiong | H04L 27/261 |
| 2020/0186279 A1 | 6/2020 | Takeda et al. | |
| 2020/0367244 A1* | 11/2020 | Yang | H04L 1/1864 |
| 2020/0374730 A1* | 11/2020 | Gao | H04L 1/0026 |
| 2021/0045143 A1* | 2/2021 | Ji | H04L 27/26025 |

FOREIGN PATENT DOCUMENTS

| | | |
|---|---|---|
| JP | 2017-506440 A | 3/2017 |
| WO | 2017/195721 A1 | 11/2017 |
| WO | 2018-012457 A1 | 1/2018 |

OTHER PUBLICATIONS

Written Opinion issued in International Application No. PCT/JP2018/011457, dated Jun. 12, 2018 (4 pages).

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).

3GPP TSG RAN WG1 Meeting #92; R1-1801550; "Discussion on handling UL multiplexing of transmissions with different reliability requirements;" vivo; Feb. 26-Mar. 2, 2018; Athens, Greece (5 pages).

Extended European Search Report issued in European Application No. 18910955.6 dated Feb. 24, 2022 (11 pages).

Office Action issued in Japanese Application No. 2020-507222 dated Apr. 12, 2022 (6 pages).

Nokia, "CR to 38.214 capturing the Jan. 18 ad-hoc and RAN1#92 meeting agreements", 3GPP TSG-RAN1 Meeting #92, R1-1803555, Athens, Feb. 26-Mar. 1, 2018 (79 pages).

Notice of Reasons for Refusal issued in Japanese Application No. 2020-507222 dated Jul. 26, 2022 (6 pages).

* cited by examiner

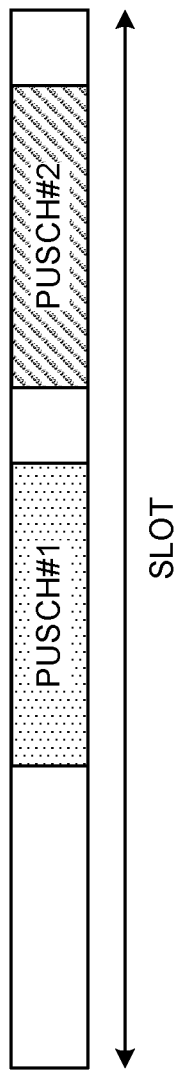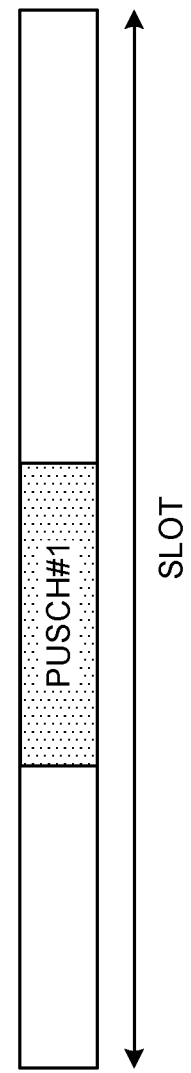

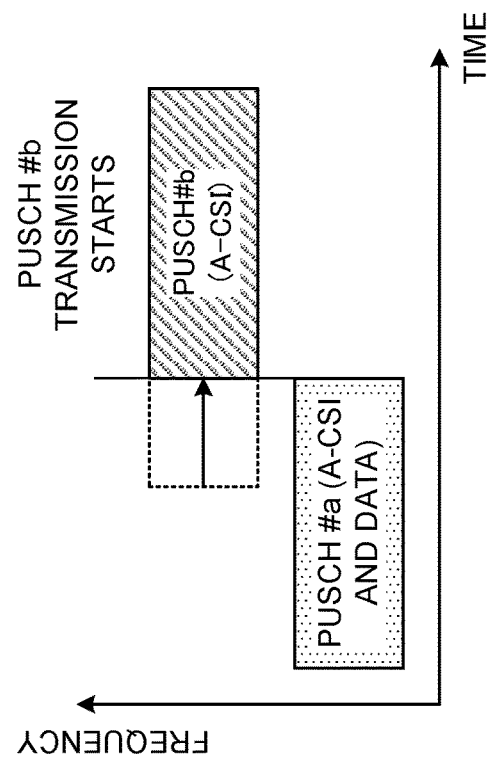
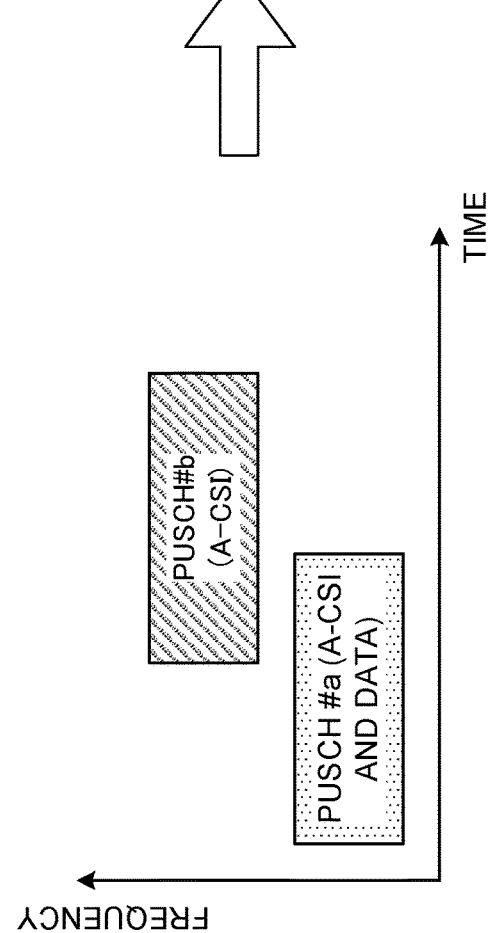
FIG. 8

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (LTE Rel. 8 and 9), LTE-Advanced (LTE-A and LTE Rel. 10, 11, 12 and 13) has been specified.

LTE successor systems (also referred to as, for example, Future Radio Access (FRA), the 5th generation mobile communication system (5G), 5G+ (plus), New Radio (NR), New Radio Access (NX), Future generation radio access (FX) and LTE Rel. 14, 15 or subsequent releases) are also studied.

In legacy LTE systems (e.g., LTE Rel. 8 to 13), a user terminal (UE: User Equipment) periodically and/or aperiodically transmits Channel State Information (CSI) to a base station. The UE transmits the CSI by using an uplink control channel (PUCCH: Physical Uplink Control Channel) and/or an uplink shared channel (PUSCH: Physical Uplink Shared Channel).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is studied for a future radio communication system (e.g., NR) to use a different uplink shared channel configuration from those of legacy LTE systems (e.g., LTE Rel. 13 and prior releases). Although, for example, the legacy LTE systems control PUSCH transmission in a subframe unit, it is also assumed for NR that PUSCH transmission (or allocation of a PUSCH) is controlled in a symbol unit.

Thus, when a CSI reporting is performed by applying a different configuration (e.g., PUSCH configuration) from those of the legacy LTE systems, it is difficult to apply a CSI reporting control method of the legacy LTE systems as is.

The present invention has been made in light of this point, and one of objects of the present invention is to provide a user terminal and a radio communication method that can appropriately control UL transmission such as a CSI reporting when communication is performed by applying a different configuration from those of legacy LTE systems.

Solution to Problem

A user terminal according to one aspect of the present disclosure includes: a transmission section that transmits one or more UL signals by using an uplink shared channel based on an instruction from a base station; and a control section that controls the transmission assuming that transmission durations of a plurality of UL signals do not overlap in a same symbol, or, when at least part of the transmission durations of the plurality of UL signals overlap in the same symbol, performs control to select and transmit the part of the UL signals.

Advantageous Effects of Invention

According to one aspect of the present disclosure, it is possible to appropriately control UL transmission such as a CSI reporting when communication is performed by applying a different configuration from those of legacy LTE systems.

BRIEF DESCRIPTION OF DRAWINGS

FIGS. 3A and 3B are diagrams illustrating another example of UL transmission control according to the first aspect.

FIG. 8 is a diagram illustrating one example of UL transmission control according to a third aspect.

DESCRIPTION OF EMBODIMENTS

Figure 1:
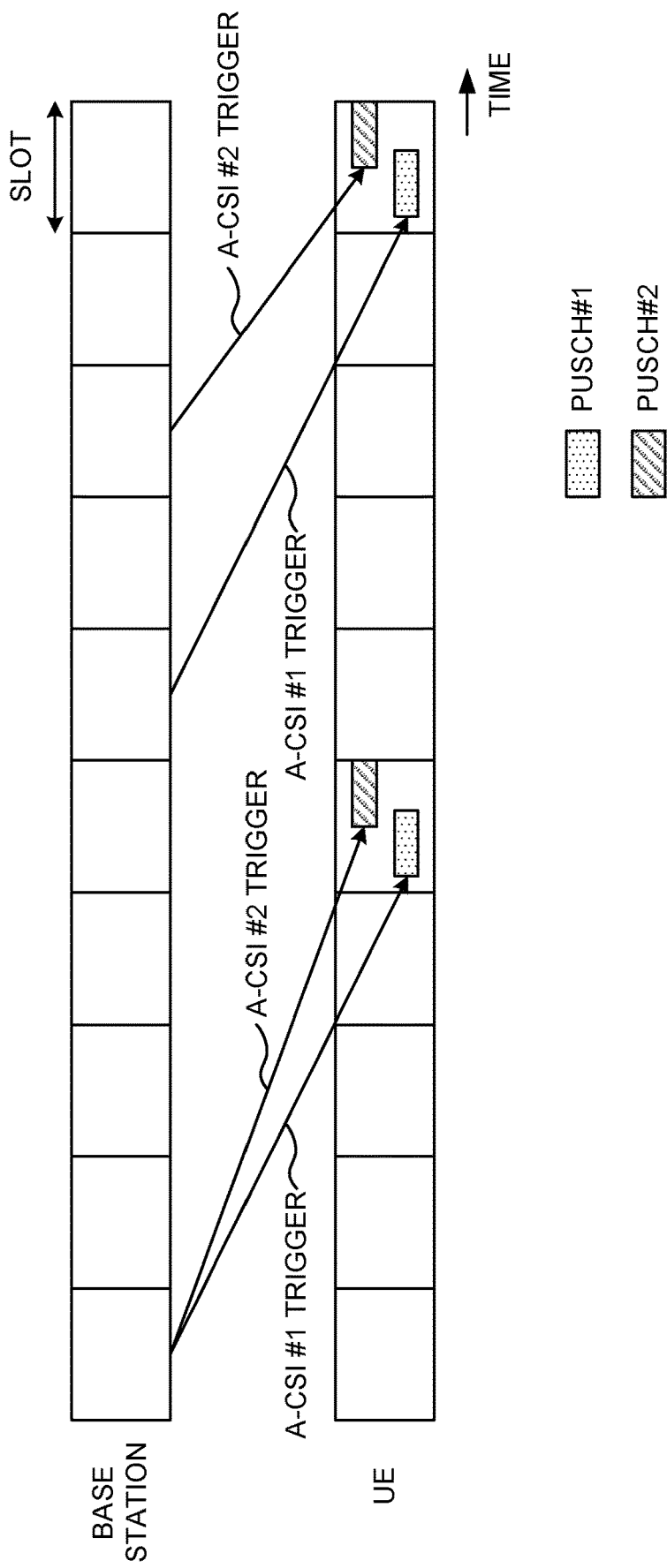
FIG. 1 is a diagram illustrating one example of transmission control of A-CSI.

According to legacy LTE systems (Rel. 10 to 13), a reference signal for measuring a channel state on downlink is specified. A reference signal for channel state measurement is also referred to as a Cell-specific Reference Signal (CRS) or a Channel State Information-Reference Signal (CSI-RS), and a reference signal that is used to measure Channel State Information (CSI) such as a Channel Quality Indicator (CQI), a Precoding Matrix Indicator (PMI) or a Rank Indicator (RI).

A UE feeds back a result measured based on the reference signal for channel state measurement as CSI to a base station. As a CSI feedback method, a Periodic CSI (P-CSI) reporting and an Aperiodic CSI (A-CSI) reporting are specified.

When performing a P-CSI reporting, the UE feeds back P-CSI per given periodicity (e.g., a 5 subframe periodicity or a 10 subframe periodicity). The UE transmits the P-CSI by using an uplink control channel of a given cell (e.g., a Primary Cell (PCell), a PUCCH cell or a Primary Secondary Cell (PSCell)).

When uplink data (e.g., PUSCH) is not transmitted at a given timing (given subframe) at which the P-CSI is reported, the UE transmits the P-CSI by using an uplink control channel (e.g., PUCCH). On the other hand, when uplink data is transmitted at the given timing, the UE can transmit P-CSI by using an uplink shared channel.

When performing an A-CSI reporting, the UE transmits A-CSI according to a CSI trigger (also referred to as a CSI request) from a base station. For example, the UE performs the A-CSI reporting a given timing (e.g., 4 subframes) after receiving the CSI trigger.

The CSI trigger notified from the base station is included in downlink control information (e.g., DCI format 0/4) for an Uplink scheduling grant (UL grant) that is transmitted by using a downlink control channel. In addition, the UL grant may be DCI for scheduling transmission of UL data (e.g., PUSCH) and/or transmission of a UL sounding (measurement) signal.

The UE transmits the A-CSI by using an uplink shared channel indicated by the UL grant according to the trigger included in the downlink control information for the UL grant. Furthermore, when CA is applied, the UE can receive a UL grant (including an A-CSI trigger) for a certain cell by a downlink control channel of another cell.

By the way, it is considered for a future radio communication system (e.g., NR) to use a CSI reporting that uses a different configuration from those of legacy LTE systems (e.g., LTE Rel. 13 or prior releases).

The legacy LTE systems control a CSI reporting by using an uplink shared channel (e.g., PUSCH) for which allocation is controlled in a subframe unit. On the other hand, it is assumed for NR to perform a CSI reporting by using a PUSCH for which allocation is controlled in an OFDM symbol (also referred to as a symbol below) unit.

Thus, when a CSI reporting (e.g., A-CSI reporting) is performed by applying a different PUSCH configuration from those of the legacy LTE systems, it is difficult to apply a CSI reporting control method of the legacy LTE systems as is.

When, for example, UL transmission that uses a given symbol (or UL transmission to be allocated to a given symbol) is restricted to one UL transmission, i.e., when transmission is performed such that a plurality of UL transmission durations do not overlap in the same symbol, how a base station side controls an instruction (or a trigger) of UL transmission matters.

When, for example, Carrier Aggregation (CA) that uses a plurality of cells (or CCs) is applied, how the base station controls the number of triggers for A-CSI reports that overlap in the same symbol matters. That is, whether or not the base station side permits an instruction of UL transmission whose transmission durations overlap in at least part of symbols matters. Furthermore, when an instruction of UL transmission whose transmission durations overlap in at least part of symbols is permitted, how to control UL transmission matters.

FIG. 1 illustrates a case where the base station triggers a plurality of pieces of A-CSI whose transmission durations overlap in at least a given symbol. In this regard, A-CSI #1 and A-CSI #2 are respectively triggered by different pieces of Downlink Control Information (e.g., DCI). Furthermore, the base station instructs the UE to transmit the A-CSI #1 and the A-CSI #2 by using a PUSCH #1 and a PUSCH #2 whose transmission durations overlap in at least part of symbols.

When triggering, for example, a plurality of pieces of A-CSI (or PUSCHs) whose transmission durations overlap in at least part of symbols is permitted (see FIG. 1), how the UE controls transmission of, for example, the pieces of triggered A-CSI matters.

Hence, the inventors of the present invention have studied whether or not UL transmission such as pieces of A-CSI whose transmission durations overlap in a symbol unit is triggered, and transmission control of UL transmission, and conceived a method for appropriately performing the UL transmission.

An embodiment according to the present disclosure will be described in detail with reference to the drawings. A radio communication method according to each embodiment may be each applied alone, or may be applied in combination.

In this regard, "overlap" means that a plurality of signals and/or channels are transmitted in at least part of identical time resources (e.g., same symbol) (transmission is triggered or scheduled). In addition, "overlap" may be read as "collide" or "overlapping".

A time resource unit is not limited to a symbol, and may be read as a slot, a mini slot or a subframe.

Furthermore, the following aspects are applicable not only to a case where CA is performed but also to a case where CA is not performed. Furthermore, A-CSI will be mainly cited as UL transmission as an example and described in the following description. However, the embodiment may be applied to other UL transmission. The other UL transmission may be UL data (or PUSCH) transmission that is scheduled by Downlink Control Information (e.g., DCI), UL data (or PUSCH) transmission that is not scheduled by DCI, or Sounding Reference Signal (e.g., SRS) transmission.

Furthermore, the following aspects may be applied to P-CSI or SP-CSI, too. The SP-CSI indicates a CSI reporting that uses a semi-permanently (semi-continuously or semi-persistently) indicated resource.

(First Aspect)

According to the first aspect, UL transmission (e.g., A-CSI reporting) that uses a given symbol is restricted to one UL transmission in at least a given cell. That is, a plurality of UL transmission (e.g., pieces of A-CSI) whose transmission durations overlap in a given symbol is restricted, and triggering is controlled such that UL transmission does not overlap at a symbol level.

A UE may assume that A-CSI reportings triggered by different pieces of DCI do not overlap in the same symbol in a given serving cell. When, for example, an A-CSI reporting is performed by using a PUSCH, the UE assumes that PUSCH resources to which A-CSI triggered by each DCI is each allocated are scheduled to symbols that do not overlap (see FIG. 2).

Figure 2:
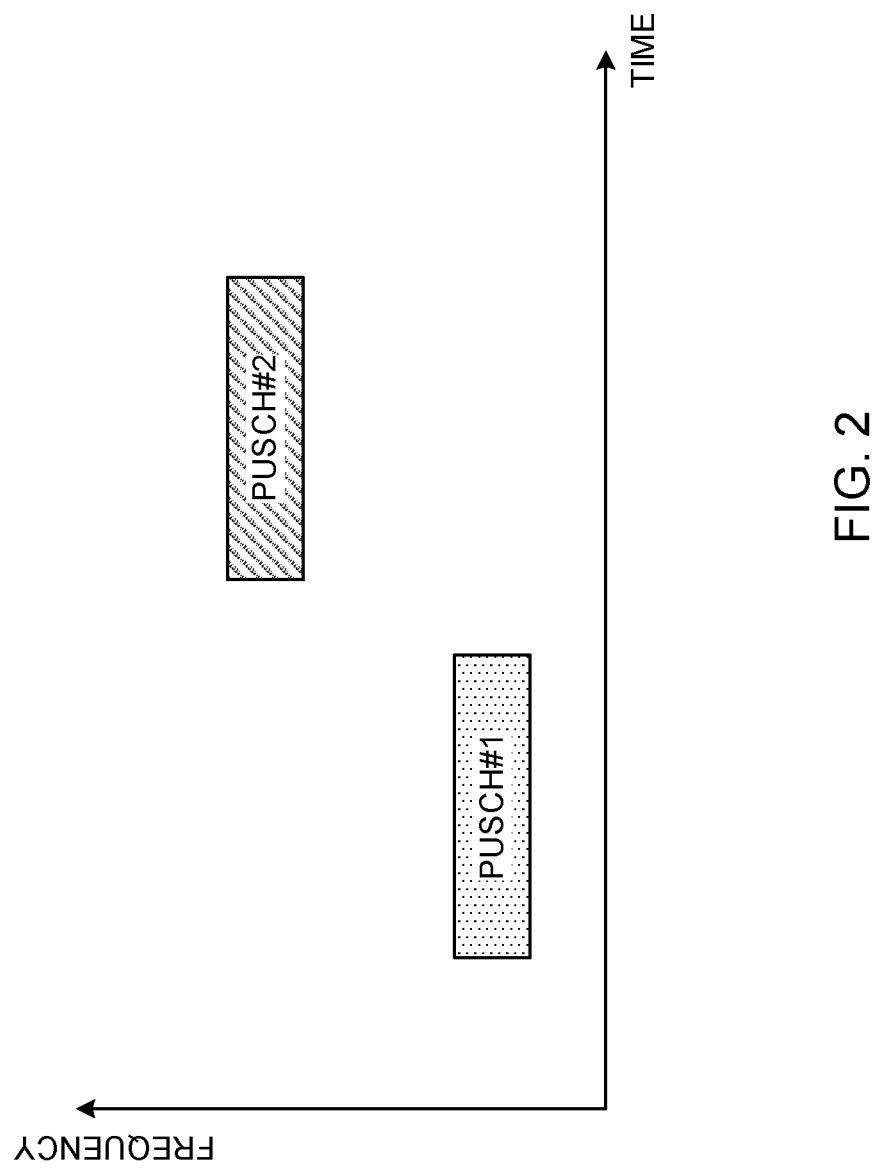
FIG. 2 is a diagram illustrating one example of UL transmission control according to a first aspect.

FIG. 2 illustrates one example of a case where a PUSCH #1 used for transmission of A-CSI #1 and a PUSCH #2 used for transmission of A-CSI #2 are scheduled to respectively different symbols (e.g., symbols that do not overlap). DCI for instructing triggering of the A-CSI #1 may include scheduling information (e.g., resource information of the PUSCH #1) of the PUSCH #1. Similarly, DCI for instructing triggering of the A-CSI #2 may include scheduling information of the PUSCH #2 (e.g., resource information of the PUSCH #2).

Thus, by restricting UL transmission (e.g., A-CSI reporting) that uses a given symbol to one UL transmission, it is not necessary to take into account a case where a plurality of UL transmission overlap, so that it is possible to simplify transmission processing of, for example, A-CSI.

In addition, when CA is applied on UL, a plurality of pieces of A-CSI (or a plurality of PUSCHs on which each A-CSI is multiplexed) triggered by different pieces of DCI may be configured to overlap in at least part of symbols between different serving cells (or CCs).

Alternatively, the UE may assume that transmission durations of A-CSI reportings triggered by different pieces of DCI do not overlap in the same symbol in at least one of a given PUCCH group and cell group. In this case, when CA is applied on UL, the UE assumes that a plurality of pieces of A-CSI (or a plurality of PUSCHs on which each A-CSI is multiplexed) do not overlap in the same symbol between a plurality of CCs included in the same PUCCH group (or the same cell group).

The PUCCH group is a group including a plurality of cells including secondary cells associated with a cell (a PCell or a PUCCH SCell) that transmits a PUCCH. Furthermore, the cell group is a group including a Master Cell Group (MCG) including a PCell and a Secondary Cell Group (SCG) including a PSCell in a case where Dual Connectivity (DC) is applied.

Thus, by performing control such that transmission durations of a plurality of A-CSI reportings do not overlap in the same symbol in the PUCCH group or the cell group, it is possible to make the transmission durations of the A-CSI reportings overlap in the same symbol between cells of different PUCCH groups or cell groups. As a result, when a plurality of PUCCH groups and/or cell groups are configured, it is possible to more flexibly control the A-CSI reportings.

Modified Example

A plurality of A-CSI reportings triggered by different pieces of DCI may be configured to be performed in an same slot. That is, control may be performed such that transmission durations of a plurality of these A-CSI reportings (or transmission durations of a PUSCH used for each A-CSI reporting) do not overlap in the same symbol in a given slot (see FIG. 3A).

In FIG. 3A, A-CSI (or the PUSCH #1 to be scheduled) triggered by DCI #1, and the A-CSI #2 (or the PUSCH #2 to be scheduled) triggered by DCI #2 are transmitted in symbols of different items of content in the same slot. Thus, by permitting triggering of UL transmission such as a plurality of pieces of A-CSI that uses different symbols in a slot, it is possible to suppress latency of, for example, the A-CSI reporting.

Alternatively, a plurality of A-CSI reportings triggered by different pieces of DCI may be configured not to be performed in an same slot. That is, control may be performed such that transmission durations of a plurality of these A-CSI reportings (or transmission durations of PUSCHs used for each A-CSI reporting) do not overlap in the same slot (see FIG. 3B). FIG. 3B illustrates a case where only A-CSI to be triggered (or the PUSCH #1 to be scheduled) by the DCI #1 is transmitted in a given slot. By so doing, it is not necessary to take into account a case where a plurality of UL transmission overlap in a slot, so that it is possible to further simplify transmission processing of, for example, A-CSI.

Furthermore, the user terminal may report whether UL transmission (e.g., A-CSI reporting) that uses a given symbol needs to be restricted to one UL transmission at maximum per slot or is restricted to one UL transmission at maximum per given symbol even though two or more UL transmission can be performed per slot during above-described UL transmission control as terminal capability information (UE capability signaling) to a radio base station. Consequently, the radio base station can appropriately control UL transmission (e.g., A-CSI reporting) that uses a given symbol based on the reported terminal capability information.

(Second Aspect)

According to the second aspect, while triggering a plurality of UL transmission (e.g., A-CSI reportings) that use a given symbol is permitted, actual UL transmission (e.g., an A-CSI reporting or PUSCH transmission) that uses the given symbol is restricted to one UL transmission. That is, a radio base station can trigger a plurality of UL transmission (e.g., pieces of A-CSI) whose transmission durations overlap in a given symbol, and a user terminal performs control to transmit part of duplicating UL transmission (drop or cancel the rest of UL transmission).

Figure 4:
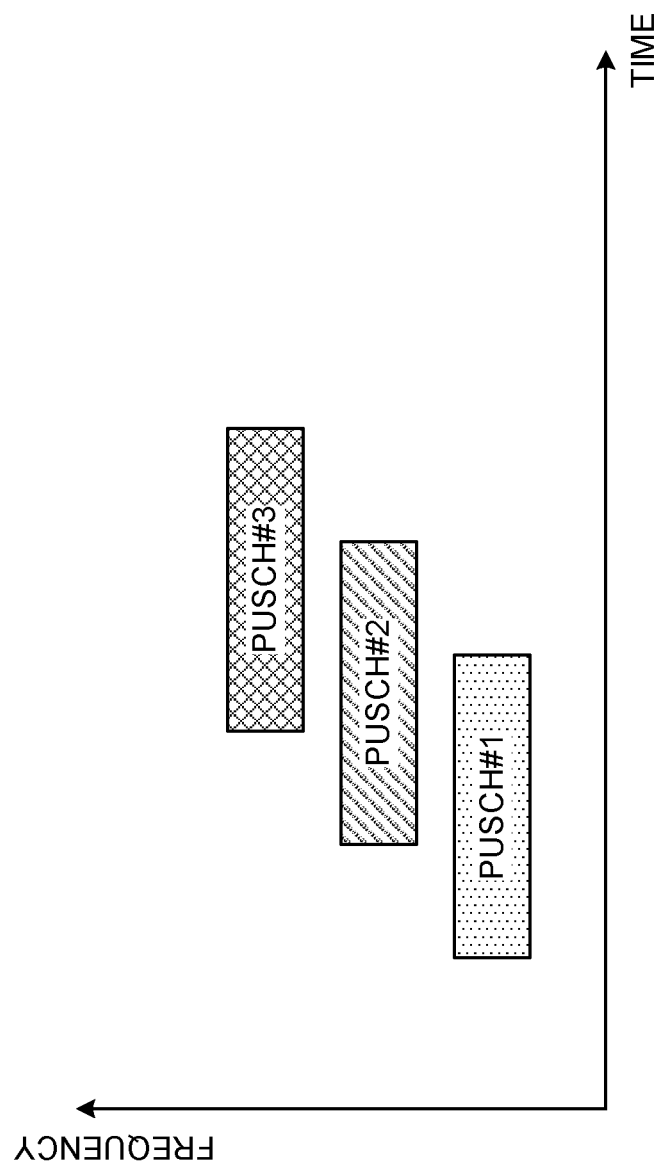
FIG. 4 is a diagram illustrating one example of UL transmission control according to a second aspect.

FIG. 4 illustrates a case where N (N>1 and N=3 in this case) PUSCHs #1 to #3 overlap and are scheduled in a given symbol. For example, the base station triggers N A-CSI (e.g., A-CSI #1 to #3) reportings that use the PUSCHs #1 to #3. The UE performs control to select and report part of the N A-CSI reportings (e.g., one A-CSI).

That is, when a plurality of UL transmission (e.g., A-CSI reportings (or PUSCH transmission on which pieces of A-CSI are multiplexed) transmitted by using the same symbol are triggered, the UE selects part of UL transmission based on a given condition, and drops the rest of UL transmission.

A case where UL transmission is controlled based on a given drop condition or transmission condition of UL transmission (e.g., A-CSI or a PUSCH) will be described by citing an example. In addition, first PUSCH transmission and second PUSCH transmission whose transmission start timing comes later than that of the first PUSCH transmission will be described by citing an example in the following description. However, applicable PUSCH transmission is not limited to two types of PUSCH transmission. Furthermore, the first PUSCH transmission and the second PUSCH transmission may be replaced with other UL transmission other than PUSCH transmission.

<UL Transmission Method 1>

According to the UL transmission method 1, UL transmission (e.g., a PUSCH resource used for transmission, A-CSI transmission or UL data) that needs to be transmitted or dropped based on a transmission start timing is decided.

For example, control may be performed to perform second PUSCH transmission (or transmission that uses a second PUSCH resource) whose transmission start timing is late preferentially over first PUSCH transmission (or transmission that uses a first PUSCH resource). That is, when the first PUSCH transmission (or first A-CSI reporting) and the second PUSCH transmission (or the second A-CSI reporting) are triggered, the UE cancels the first PUSCH transmission (on-going PUSCH transmission) whose transmission start timing is early, and performs the second PUSCH transmission (see FIG. 5).

In addition, dropping or cancelling given PUSCH transmission may be defined as that transmission power given to the PUSCH transmission after a cancelling operation is started is made a given level (e.g., −40 dBm) or less within a given time (e.g., 20 μs). In this case, it is possible to avoid that given PUSCH transmission dropped or cancelled by the user terminal continues, and reduce an interference. Alternatively, dropping or cancelling the given PUSCH transmission may be defined as that making transmission quality (e.g., EVM) of the PUSCH transmission a given level or less is permitted. In this case, whether or not to actually stop (or how to stop) transmission depends on the user terminal, so that it is possible to realize a cancelling operation by multiple implementations.

Figure 5:
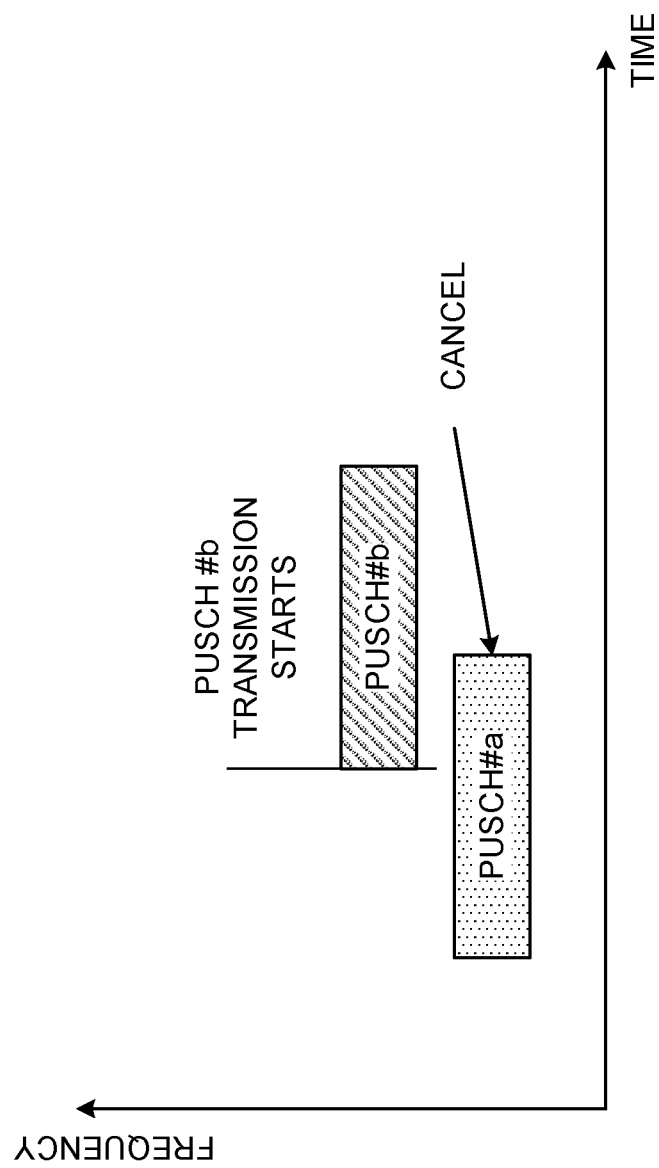
FIG. 5 is a diagram illustrating another example of UL transmission control according to the second aspect.

FIG. 5 illustrates a case where, when transmission (PUSCH #a) that uses the first PUSCH resource whose transmission duration overlaps in at least part of symbols, and transmission (PUSCH #b) that uses the second PUSCH resource is triggered or scheduled, the PUSCH #b is preferentially transmitted. Thus, by preferentially performing transmission that uses the second PUSCH resource whose transmission start timing is late, it is possible to control UL transmission based on a latest instruction made by a base station.

In FIG. 5, the UE drops or cancels a UL signal (e.g., at least one of A-CSI and UL data) that is transmitted by using the first PUSCH resource (PUSCH #a). For example, it is assumed that the base station instructs the UE to transmit A-CSI #a including A-CSI reporting IDs #1 and #3 by using the PUSCH #a, and transmit A-CSI #b including A-CSI reporting IDs #2 and #4 by using the PUSCH #b. In this case, the UE performs control to cancel the PUSCH #a, and transmit the A-CSI #b including the A-CSI reporting IDs #2 and #4 by using the PUSCH #b.

Thus, at least one of a PUSCH to be transmitted and a PUSCH to be dropped is determined based on a transmission start timing of UL transmission (e.g., PUSCH transmission) triggered or scheduled by the base station. Consequently, even when PUSCH transmission (e.g., A-CSI reportings) whose transmission durations overlap in at least part of symbols is triggered, it is possible to appropriately decide and transmit PUSCH transmission that needs to be transmitted.

<UL Transmission Method 2>

According to the UL transmission method 2, transmission or UL transmission (e.g., a PUSCH resource used for transmission, A-CSI transmission or UL data) that needs to be dropped is decided based on at least one of a transmission start timing and a given priority condition.

For example, control may be performed to perform second PUSCH transmission (or transmission that uses the second PUSCH resource) whose transmission start timing is late preferentially over first PUSCH transmission (or transmission that uses the first PUSCH resource). Furthermore, a UL signal that is transmitted by using the second PUSCH resource is determined based on the given priority condition.

The priority condition may be determined based on at least one of a UL transmission scheme (e.g., whether UL transmission is Ultra Reliable and Low Latency Communications (URLLC) or enhanced Mobile Broad Band (eMBB)), a UL signal type, a supported cell type, and an index number of each signal. In addition, the priority condition may be defined in advance by a specification, or may be notified by using at least one of a higher layer signaling and downlink control information from the base station to the UE.

For example, a UL signal to be transmitted (or a UL signal to be dropped) may be determined based on a following priority condition #a and priority condition #b. In this case, after decision is made based on the priority condition #a, the priority condition #b only needs to be taken into account. In this regard, the priority condition #a indicates a priority related to the UL transmission scheme, and the priority condition #b indicates a priority related to the UL signal type. In addition, a priority condition for a UL signal whose signal type is the same may be further specified as the priority condition #b. In addition, the priority conditions #a and #b are one example, and are not limited to these. A priority order of each priority condition may be switched as appropriate. Furthermore, the UL transmission scheme is not limited to ULRRC and eMBB.

Priority condition #a: A UL signal that matches URLLC is prioritized over a UL signal that matches eMBB (URLLC>eMBB)

Priority condition #b: A-CSI>A-SRS>UL data

Priority Control Example 1

It is assumed as one example that A-CSI for URLLC is triggered by one of the PUSCH #a and the PUSCH #b in FIG. 5, and A-CSI for eMBB is triggered by the other one of the PUSCH #a and the PUSCH #b. In this case, the UE performs an A-CSI reporting for URLLC by using the PUSCH #b (second PUSCH resource) based on the priority condition #a. Control may be performed to drop A-CSI for eMBB.

Priority Control Example 2

It is assumed as another example that A-CSI for URLLC is triggered by one of the PUSCH #a and the PUSCH #b in FIG. 5, and A-CSI for URLLC is triggered by the other one of the PUSCH #a and the PUSCH #b. In this case, the priority condition #a is the same, and therefore the UE determines the UL signal to be transmitted (or the UL signal to be dropped) based on the priority condition #b. In addition, the UL signal type is A-CSI and the same, and therefore the priority condition for a UL signal whose signal type is the same may be applied.

The priority condition for the UL signal whose signal type is the same may be determined based on at least one of an operation method of A-CSI in a time domain, contents of the A-CSI, a cell ID associated with the A-CSI, and a CSI reporting ID. For example, CSI to be transmitted may be determined based on following priority conditions #b-1 to #b-4. In this case, the priority conditions are preferentially applied in order of the priority conditions #b-1 to #b-4.

Priority condition #b-1: The operation in the time domain (A-CSI>SP-CSI that uses a PUSCH>SP-CSI that uses a PUCCH>P-CSI)

Priority condition #b-2: CSI contents (beam reporting>CSI)

Priority condition #b-3: A cell ID (PCell>PSCell>SCell (an SCell whose index is smaller))

Priority condition #b-4: A CSI reporting ID (a CSI reporting ID whose index is smaller)

FIG. 5 assumes a case as one example where the base station instructs the UE to transmit the A-CSI #a including the A-CSI reporting IDs #1 and #3 by using the PUSCH #a, and transmit the A-CSI #b including the A-CSI reporting IDs

2 and #4 by using the PUSCH #b. When the priority conditions #b-1 to #b-3 are the same between the A-CSI #a and the A-CSI #b, A-CSI to be transmitted is determined based on the priority condition #b-4. For example, the UE reports the A-CSI reporting ID #1 and the A-CSI reporting ID #2 by using the PUSCH #b (second PUSCH resource).

Thus, by selecting a UL signal to be transmitted based on at least one of the UL transmission scheme and the UL signal type, it is possible to appropriately decide and transmit a PUSCH resource and a UL signal that need to be transmitted even when PUSCH transmission whose transmission durations overlap in at least part of symbols is triggered.

Priority Control Example 3

It is assumed as another example that only A-CSI is triggered by one of the PUSCH #a and the PUSCH #b, and A-CSI and UL data are triggered or scheduled by the other one of the PUSCH #a and the PUSCH #b. FIG. 6 illustrates that the A-CSI #a that uses the PUSCH #a and UL data are triggered or scheduled, and the A-CSI #b that uses the PUSCH #b is triggered.

For example, it is assumed that transmission of A-CSI is prioritized over UL data (the UL transmission scheme is the same and the priority condition #2 is applied). In this case, control is performed to selectively transmit the A-CSI by using the PUSCH #b (second PUSCH resource) (not to transmit UL data) (see FIG. 6A). In this case, the A-CSI that is transmitted using the PUSCH #b may be the A-CSI #b that is triggered in advance for the PUSCH #b. Alternatively, A-CSI to be transmitted may be determined based on the above-described priority conditions #b-1 to #b-4.

Alternatively, it is assumed that transmission of UL data is prioritized over A-CSI (e.g., A-CSI #b) (e.g., URLLC is applied to UL data, eMBB is applied to the A-CSI #b and the priority condition #a is applied). In this case, control is performed to transmit the UL data preferentially over the A-CSI #b by using the PUSCH #b (second PUSCH resource) (see FIG. 6B). In this case, the A-CSI that is transmitted using the PUSCH #b may be the A-CSI #a that is triggered for the PUSCH #a similar to the UL data. Alternatively, there may be employed a configuration where only the UL data is transmitted, and the A-CSI is not transmitted.

Priority Control Example 4

It is assumed as another example that only UL data is scheduled by one of the PUSCH #a and the PUSCH #b (A-CSI and A-SRS are not triggered), and only UL data is scheduled by the other one of the PUSCH #a and the PUSCH #b (the A-CSI and the A-SRS are not triggered). In this case, UL data to be actually transmitted is determined based on the UL transmission scheme. When, for example, one UL data is for URLLC, and the other UL data is for eMBB, the UL data for URLLC is transmitted by using a given PUSCH resource (e.g., second PUSCH resource).

Priority Control Example 5

It is assumed as another example that A-SRS is triggered by one of the PUSCH #a and the PUSCH #b, and A-CSI and UL data are triggered or scheduled by the other one of the PUSCH #a and the PUSCH #b.

The UE first takes into account a transmission scheme to be applied to A-SRS, and a transmission scheme to be applied to A-CSI and UL data (priority condition #a). When, for example, URLLC is applied to the A-CSI and the UL data, and eMBB is applied to the A-SRS, the UE performs control to preferentially transmit the A-CSI and the UL data, and drop the A-SRS.

When the transmission scheme to be applied to the A-SRS and the transmission scheme to be applied to the A-CSI and the UL data are the same, the UE determines the UL signal that is transmitted based on a priority of the UL signal type (priority condition #b). When the priority condition #b is A-CSI>A-SRS>UL data, transmission of the A-CSI is prioritized the most, and therefore the UE transmits at least the A-CSI.

Furthermore, control may be performed to transmit the UL data that is scheduled to the same PUSCH as that of the A-CSI, and drop the A-SRS. Alternatively, control may be performed to drop the UL data, and transmit the A-CSI and the A-SRS. Alternatively, control may be performed to drop the UL data and the A-SRS, and transmit only the A-CSI. In addition, whether or not to transmit at least one of the UL data and the A-SRS may be determined based on a capacity of a PUSCH resource (e.g., PUSCH #b) used for transmission.

Modified Example

Above FIGS. 5 and 6 illustrate a case where, when PUSCH transmission (e.g., A-CSI reportings) whose transmission durations overlap in at least part of symbols is triggered, the second PUSCH resource (PUSCH #b) whose transmission start timing is late is used. However, the embodiment is not limited to this. As illustrated in, for example, FIG. 7, the first PUSCH resource (PUSCH #a) whose transmission start timing is early may be used.

Figures 6A, 6B:
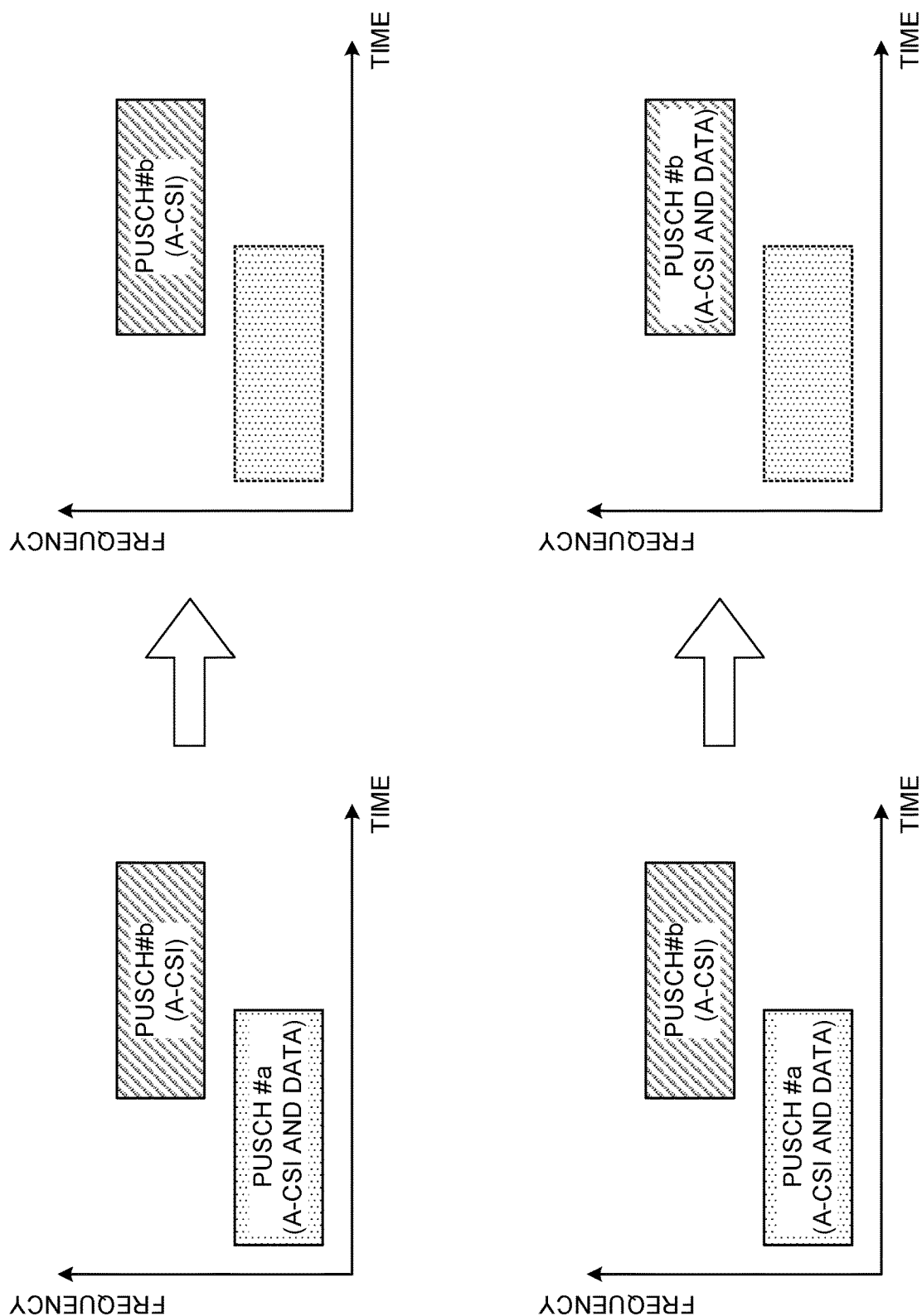
FIGS. 6A and 6B are diagrams illustrating another example of UL transmission control according to the second aspect.
Figure 7A:
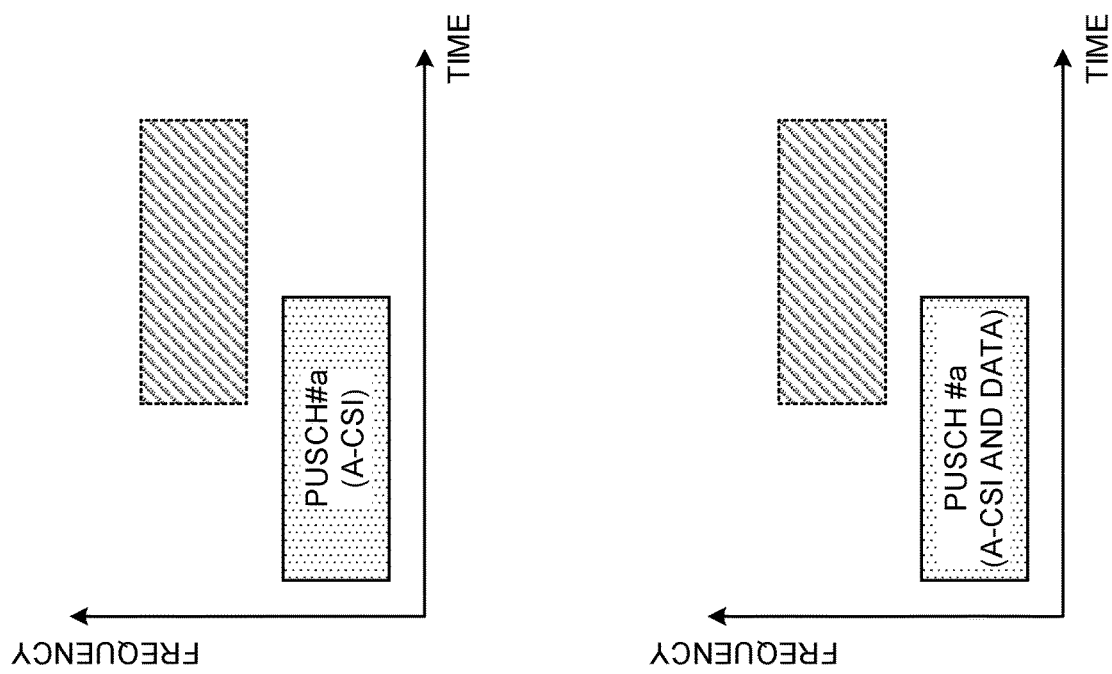
FIGS. 7A and 7B are diagrams illustrating another example of UL transmission control according to the second aspect.
Figure 7B:
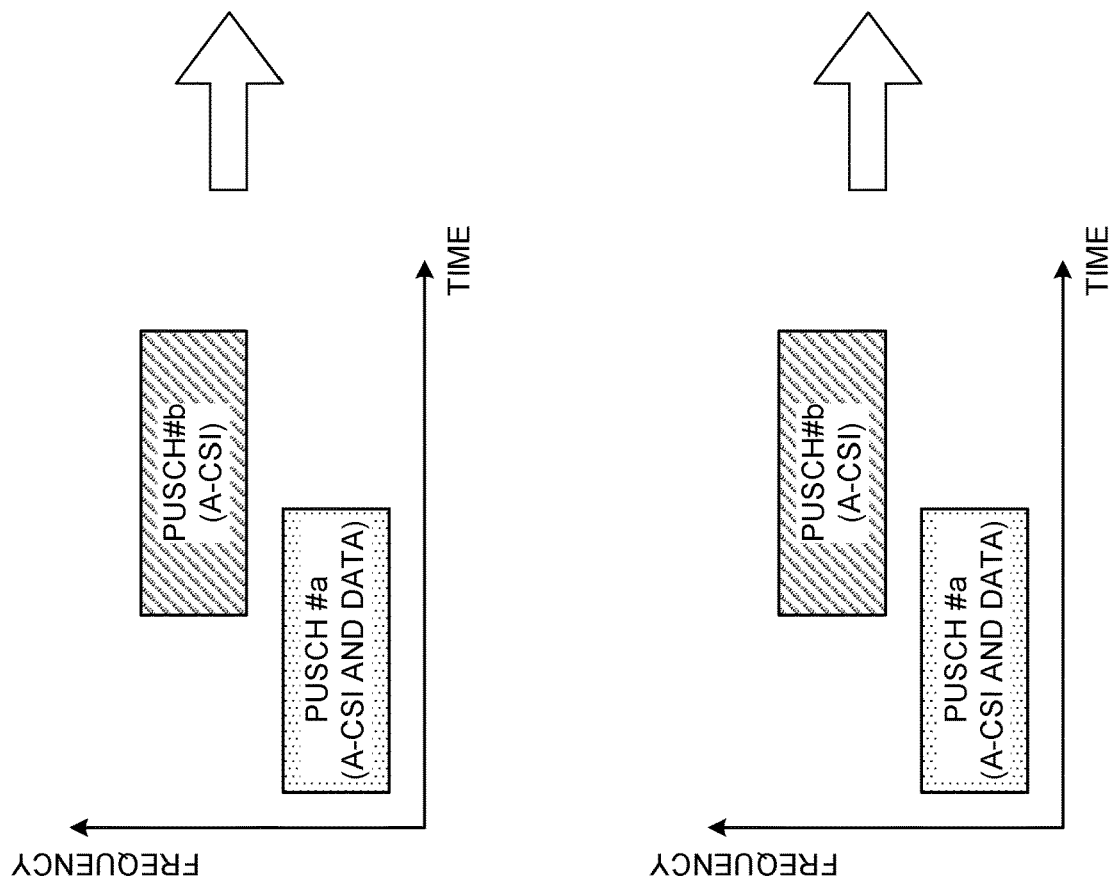

There may be employed a configuration where, for example, instead of using the second PUSCH resource (PUSCH #b) in FIGS. 6A and 6B, the first PUSCH resource (PUSCH #a) is used as illustrated in FIGS. 7A and 7B.

Alternatively, when PUSCH transmission (e.g., A-CSI reportings) whose transmission durations overlap in at least part of symbols is triggered, the PUSCH resource used for UL transmission may be selected based on another parameter (e.g., the length of the transmission duration) instead of the transmission start timing.

Alternatively, a PUSCH resource used for transmission may be selected based on a UL signal (e.g., at least one of A-CSI and UL data) to be actually transmitted. For example, a PUSCH resource (e.g., the PUSCH #a in FIG. 6) to which the UL data is scheduled includes a larger number of resources (e.g., PRBs) to be allocated than a PUSCH resource (e.g., the PUSCH #b in FIG. 6) that triggers only the A-CSI.

In this case, when UL data is transmitted based on a given priority condition, the UE may perform control to perform UL transmission using a PUSCH resource (the PUSCH #a in FIG. 6) to which the UL data has been scheduled. Consequently, it is possible to use the PUSCH resource allocated for UL transmission (e.g., UL data) that is actually transmitted, so that it is possible to avoid a problem that PUSCH resources become insufficient.

Furthermore, the above description has described the case where, when a plurality of PUSCHs used for transmission of pieces of A-CSI triggered by different pieces of DCI overlap in a given symbol, one of the pieces of A-CSI is transmitted. However, the embodiment is not limited to this. The UE may control A-CSI to be multiplexed on the given PUSCH based on a code rate determined based on a resource amount to be allocated to the given PUSCH.

When, for example, the code rate becomes a given value or less in a case where a plurality of pieces of A-CSI triggered by different pieces of DCI are transmitted using a given PUSCH resource, a plurality of these pieces of A-CSI may be multiplexed on the given PUSCH and transmitted. Consequently, it is possible to transmit, for example, a larger number of pieces of A-CSI based on, for example, a PUSCH resource used for UL transmission, so that it is possible to improve resource use efficiency.

(Third Aspect)

According to the third aspect, a plurality of PUSCHs used for transmission of, for example, pieces of A-CSI triggered by different pieces of DCI overlap in a given symbol, control is performed to shift transmission start timings such that a plurality of these PUSCHs do not overlap.

FIG. 8 illustrates a case where, when transmission (PUSCH #a) that uses a first PUSCH resource that overlaps in at least part of symbols, and transmission (PUSCH #b) that uses a second PUSCH resource are triggered or scheduled, the transmission start timings are shifted such that the PUSCH #a and the PUSCH #b do not overlap.

In this case, FIG. 8 illustrates a case where control is performed to shift the transmission start timing of the PUSCH #b whose transmission start timing is late such that the PUSCH #b and the PUSCH #a do not overlap. FIG. 8 illustrates a case where transmission start timings are shifted such that the PUSCH #b is contiguously transmitted subsequent to the PUSCH #a (a case where a symbol next to an end symbol of the PUSCH #a is a start symbol of the PUSCH #b). Consequently, it is possible to minimize an influence of latency of the PUSCH #b.

In addition, the PUSCH #b may be shifted such that the PUSCH #a and the PUSCH #b do not become contiguous. For example, the PUSCH #b may be shifted so as to be transmitted in a subsequent given slot. The given slot may be a slot including a time period indicated/configured as UL by UL-DL allocation defined by a higher layer signaling or UL-DL allocation indicated by a Slot Format Indication (SFI). Furthermore, when the PUSCH #b is shifted to the given slot, a transmission start symbol of the PUSCH #b in the slot may be identical to a start symbol indicated by the DCI. Consequently, it is possible to flexibly control a transmission start timing of the PUSCH #b.

In addition, control may be performed to transmit the PUSCH #b without shifting the PUSCH #b and using a symbol of the PUSCH #b that overlaps with the PUSCH #a.

(Radio Communication System)

The configuration of the radio communication system according to one embodiment of the present disclosure will be described below. This radio communication system uses one or a combination of the radio communication method according to each of the above embodiment of the present disclosure to perform communication.

Figure 9:
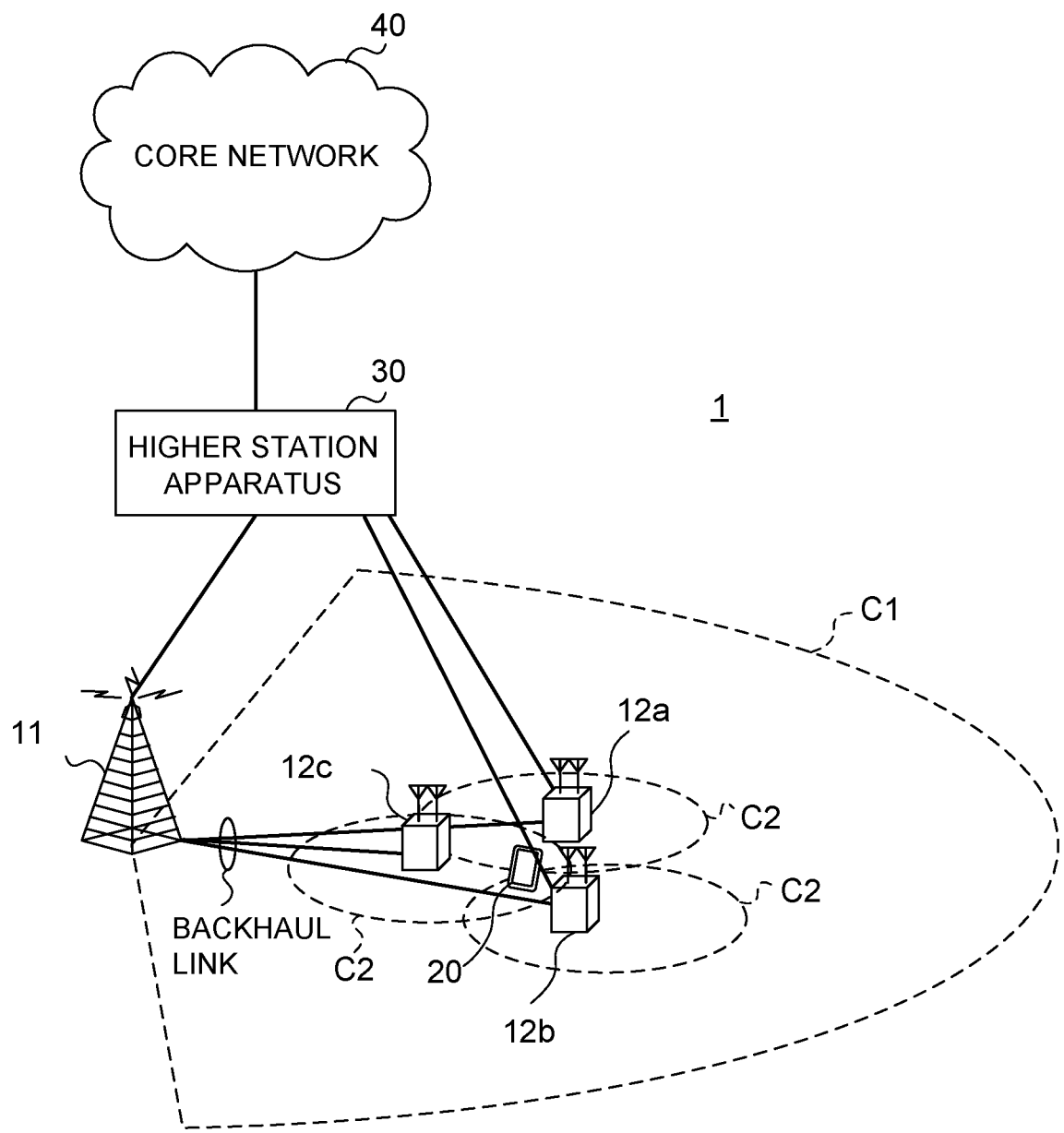
FIG. 9 is a diagram illustrating one example of a schematic configuration of a radio communication system according to one embodiment.

FIG. 9 is a diagram illustrating one example of a schematic configuration of the radio communication system according to the one embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to the aspect illustrated in FIG. 9.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 can apply CA or DC by using a plurality of cells (CCs).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may be a communication parameter to be applied to transmission and/or reception of a certain signal and/or channel, and may indicate at least one of, for example, a subcarrier spacing, a bandwidth, a symbol length, a cyclic prefix length, a subframe length, a TTI length, the number of symbols per TTI, a radio frame configuration, specific filtering processing performed by a transceiver in a frequency domain, and specific windowing processing performed by the transceiver in a time domain. For example, a case where subcarrier spacings of constituent OFDM symbols are different and/or a case where the numbers of OFDM symbols are different on a certain physical channel may be read as that numerologies are different.

The radio base station 11 and each radio base station 12 (or the two radio base stations 12) may be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and a System Information Block (SIB) are conveyed on the PDSCH. Furthermore, a Master Information Block (MIB) is conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific reference signal). Furthermore, a reference signal to be conveyed is not limited to these.

(Radio Base Station)

Figure 10:
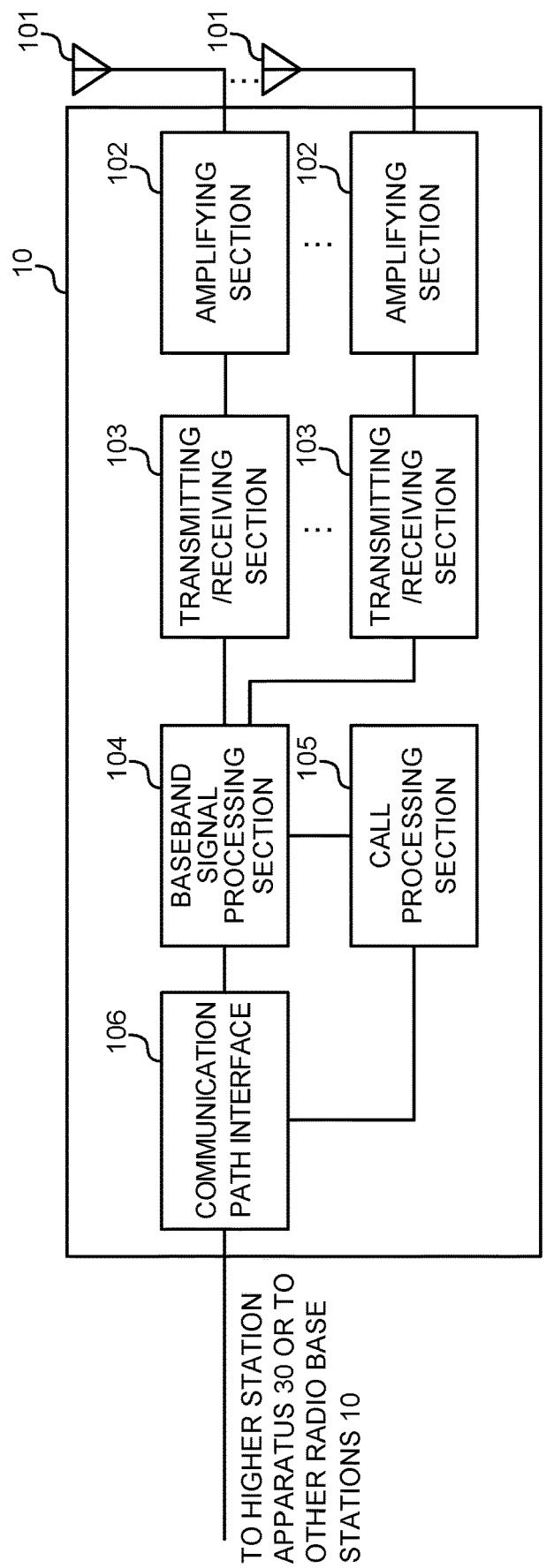
FIG. 10 is a diagram illustrating one example of an overall configuration of a radio base station according to the one embodiment.

FIG. 10 is a diagram illustrating one example of an overall configuration of the radio base station according to the one embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency range, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present disclosure. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as an uplink signal. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs call processing (such as a configuration and release) of a communication channel, state management of the radio base station 10 and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Each transmission/reception section 103 may receive channel state information (e.g., A-CSI) transmitted from the user terminal 20 by using a resource indicated by DCI. Each transmission/reception section 103 may transmit a CSI transmission instruction (a trigger or a UL grant) to the user terminal 20. Furthermore, each transmission/reception section 103 may transmit information related to a priority of an A-CSI reportings to the user terminal 20.

Figure 11:
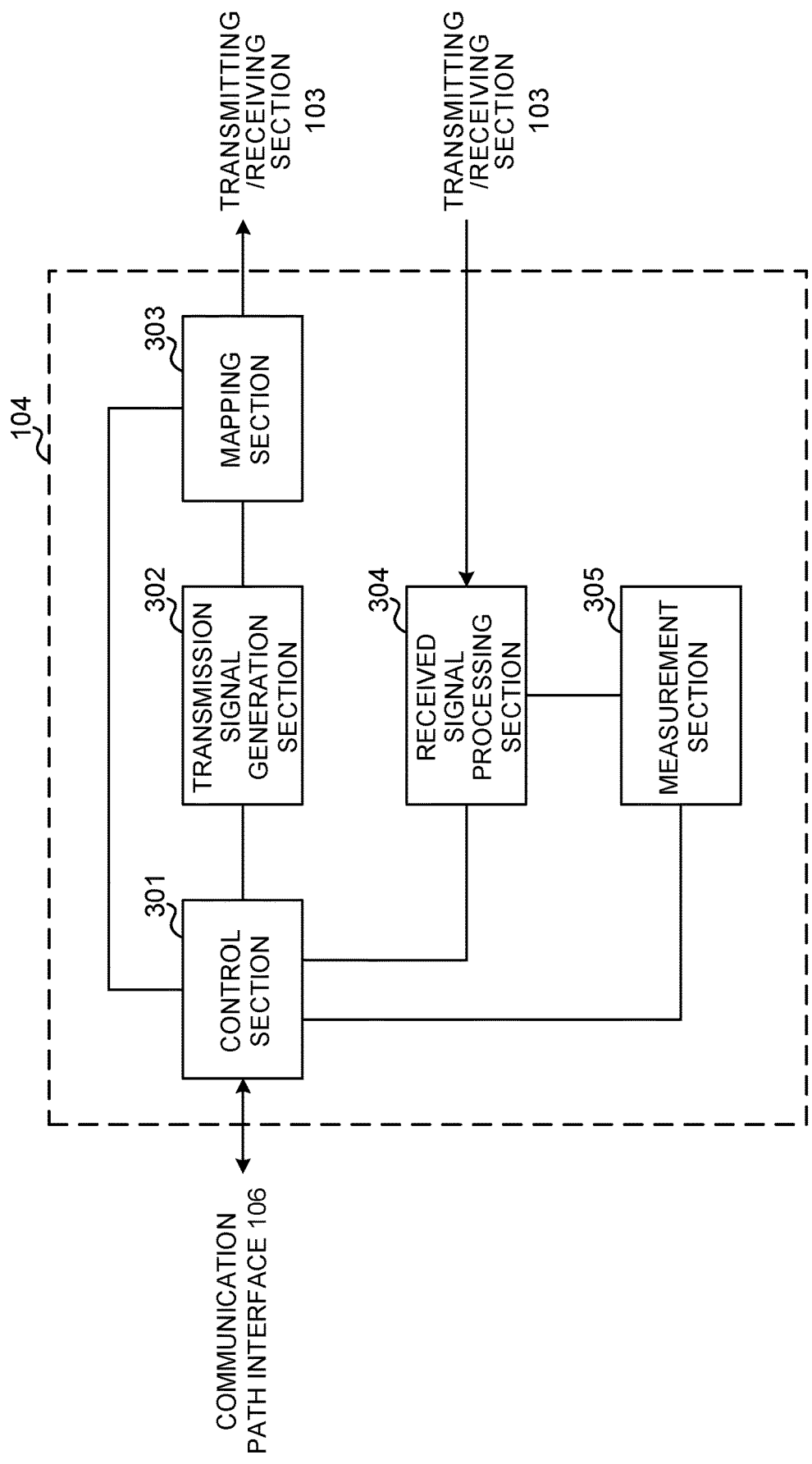
FIG. 11 is a diagram illustrating one example of a function configuration of the radio base station according to the one embodiment.

FIG. 11 is a diagram illustrating one example of a function configuration of the radio base station according to the one embodiment of the present disclosure. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal.

The control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

The control section 301 controls scheduling of an uplink data signal (e.g., a signal that is transmitted on the PUSCH), an uplink control signal (e.g., a signal that is transmitted on the PUCCH and/or the PUSCH and is, for example, transmission acknowledgement information), a random access preamble (e.g., a signal that is transmitted on the PRACH) and an uplink reference signal.

The control section 301 may perform control such that transmission durations of a plurality of UL signals (e.g., pieces of A-CSI) do not overlap in the same symbol. Furthermore, the control section 301 may perform control to configure to different symbols in an identical slot the transmission durations of a plurality of UL signals whose transmission is instructed based on different pieces of downlink control information, or may perform control not to configure the transmission durations of a plurality of UL signals in the identical slot.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, a DL assignment for giving notification of downlink data allocation information, and/or a UL grant for giving notification of uplink data allocation information based on the instruction from the control section 301. The DL assignment and the UL grant are both DCI, and conform to a DCI format. Furthermore, the transmission signal generating section 302 performs encoding processing and modulation processing on the downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmission/reception section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 12:
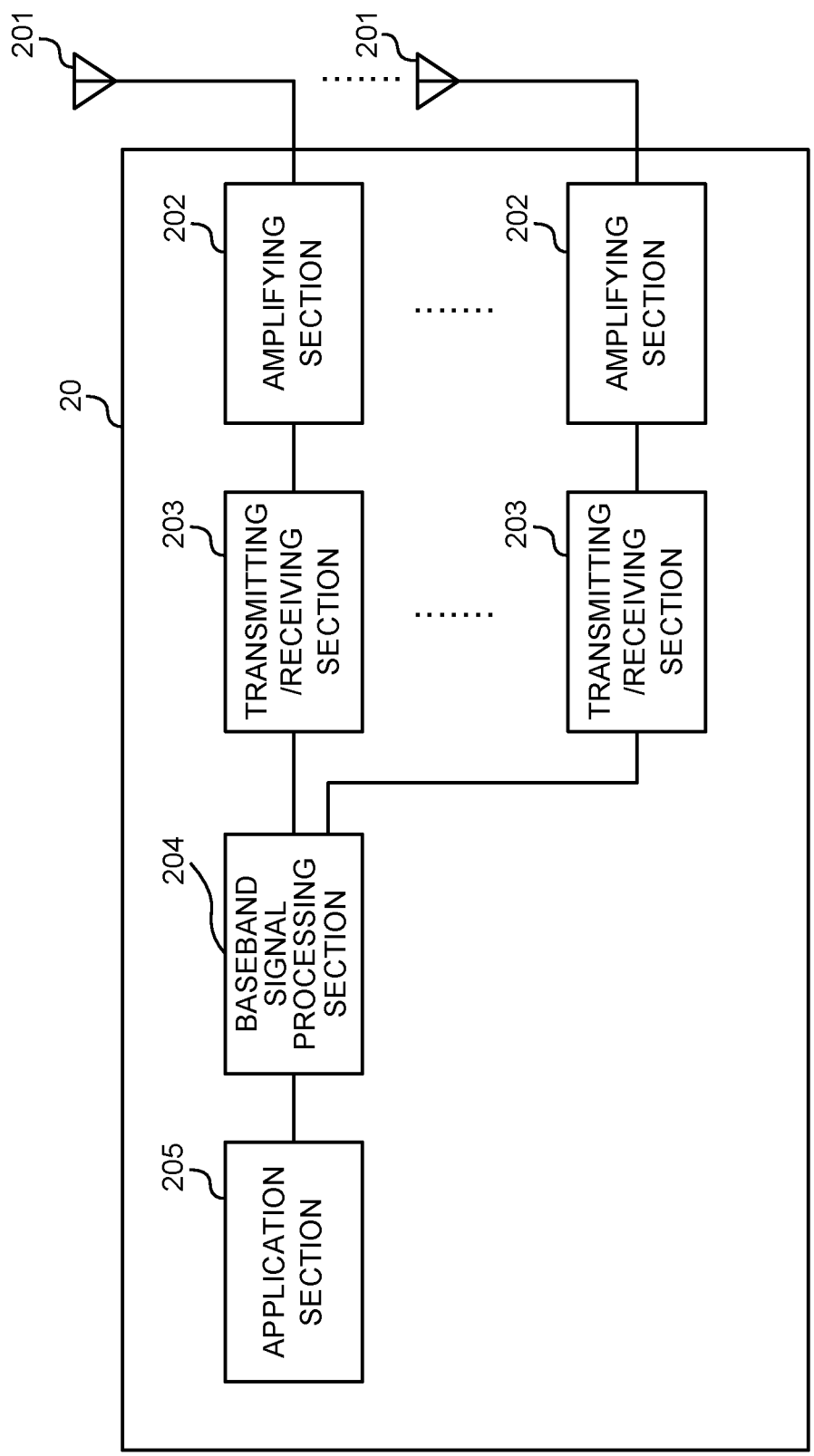
FIG. 12 is a diagram illustrating one example of an overall configuration of a user terminal according to the one embodiment.

FIG. 12 is a diagram illustrating one example of an overall configuration of the user terminal according to the one embodiment. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present disclosure. In this regard, the transmission/reception sections 203 may be composed as an integrated transmission/reception section or may be composed of transmission sections and reception sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmission/reception section 203.

Each transmission/reception section 203 converts the baseband signal output from the baseband signal processing section 204 into a radio frequency range, and transmits a radio frequency signal. The radio frequency signal subjected to the frequency conversion by each transmission/reception section 203 is amplified by each amplifying section 202, and is transmitted from each transmission/reception antenna 201.

Each transmission/reception section 203 transmits one or more UL signals by using an uplink shared channel based on an instruction from the base station. Each transmission/reception section 203 may receive the CSI transmission instruction (the trigger or the UL grant). Furthermore, each transmission/reception section 203 may receive information related to the priority of the A-CSI reportings.

Figure 13:
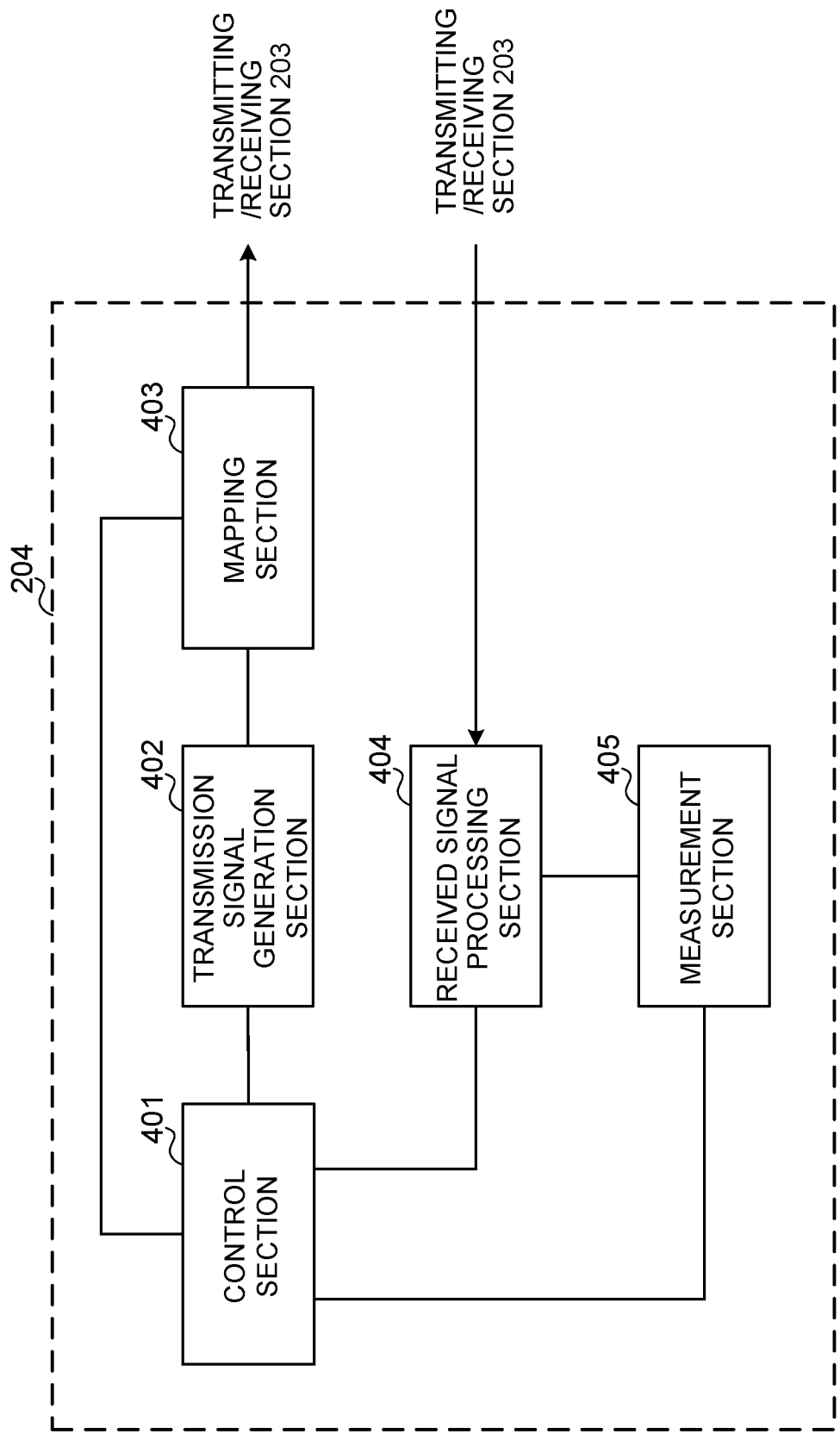
FIG. 13 is a diagram illustrating one example of a function configuration of the user terminal according to the one embodiment.

FIG. 13 is a diagram illustrating one example of a function configuration of the user terminal according to the one embodiment. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 may control transmission assuming that the transmission durations of a plurality of UL signals do not overlap in the same symbol. In this case, the control section 401 may assume that the transmission durations of a plurality of UL signals whose transmission is instructed based on the different pieces of downlink control information can be configured to different symbols in an identical slot.

Alternatively, the control section 401 may perform control to select and transmit part of the UL signals when at least part of the transmission durations of a plurality of UL signals overlap in the same symbol. For example, the control section 401 may perform control to transmit part of the UL signals using an uplink shared channel whose transmission start timing is late when a plurality of uplink shared channels are scheduled for transmission of a plurality of UL signals. Furthermore, the control section 401 may determine the part of the UL signals based on at least one of a UL transmission scheme, a UL signal type, a cell type that supports UL transmission, and index numbers of the UL signals.

Alternatively, the control section 401 may perform control to shift a transmission start timing of at least one uplink shared channel such that, when at least part of transmission durations of a plurality of uplink shared channels scheduled for transmission of a plurality of UL signals overlap in the same symbol, the transmission durations of a plurality of uplink shared channels do not overlap.

Furthermore, when obtaining from the received signal processing section 404 various pieces of information notified from the radio base station 10, the control section 401 may update a parameter used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates, for example, an uplink control signal related to transmission acknowledgement information and Channel State Information (CSI) based on the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmission/reception section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmission/reception section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present disclosure. Furthermore, the received signal processing section 404 can compose the reception section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by way of, for example, wired connection and/or radio connection).

Figure 14:
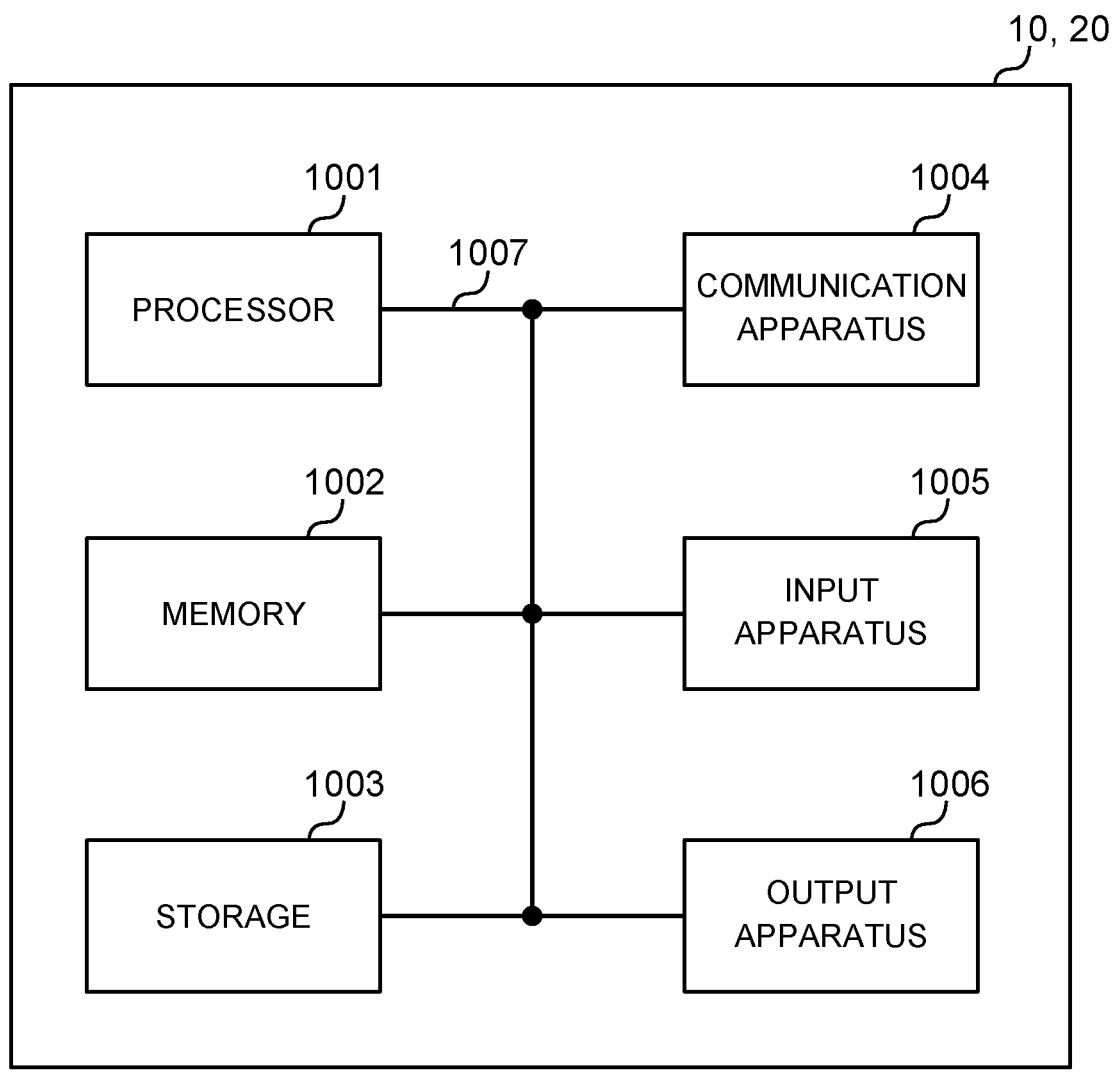
FIG. 14 is a diagram illustrating one example of hardware configurations of the radio base station and the user terminal according to the one embodiment.

For example, the radio base station and the user terminal according to the one embodiment of the present disclosure may function as computers that perform processing of the radio communication method according to the present disclosure. FIG. 14 is a diagram illustrating one example of the hardware configurations of the radio base station and the user terminal according to the one embodiment. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 14 or may be configured without including part of the apparatuses.

For example, FIG. 14 illustrates the only one processor 1001. However, there may be a plurality of processors. Furthermore, processing may be executed by 1 processor or processing may be executed by one or more processors concurrently or successively or by using another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time domain. Each of one or a plurality of durations (frames) that composes a radio frame may be referred to as a subframe. Furthermore, the subframe may include one or a plurality of slots in the time domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI)

may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. Furthermore, the RB may include one or a plurality of symbols in the time domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are interchangeably used.

In this description, the terms "Base Station (BS)", "radio base station", "eNB", "gNB", "cell", "sector", "cell group", "carrier" and "component carrier" can be interchangeably used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of the base station and/or the base station subsystem that provide a communication service in this coverage.

In this description, the terms "Mobile Station (MS)", "user terminal", "user apparatus (UE: User Equipment)" and "terminal" can be interchangeably used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present disclosure may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideB and (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that one or more intermediate elements exist between the two elements "connected" or "coupled" with each other. The elements may be coupled or connected physically or logically or by a combination of these physical and logical connections. For example, "connection" may be read as "access".

It can be understood in this description that, when connected, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The invention according to the present disclosure has been described in detail above. However, it is obvious for a person skilled in the art that the invention according to the present disclosure is not limited to the embodiment described in this description. The invention according to the present disclosure can be carried out as modified and changed aspects without departing from the gist and the scope of the invention defined based on the recitation of the claims. Accordingly, the disclosure of this description is intended for exemplary explanation, and does not bring any restrictive meaning to the invention according to the present disclosure.

The invention claimed is:

1. A terminal comprising:
   a receiver that receives a Downlink Control Information (DCI) to trigger an Aperiodic Channel State Information (A-CSI) report; and
   a processor that controls to not transmit a plurality of A-CSI reports in a given transmission duration,
   wherein, when the plurality of A-CSI reports is triggered by different DCIs, the processor does not expect to transmit, in a single carrier, the plurality of A-CSI reports on overlapping Orthogonal Frequency Division Multiplexing (OFDM) symbols, the plurality of A-CSI reports using a physical uplink shared channel.

2. The terminal according to claim 1, wherein the given transmission duration is a slot.

3. The terminal according to claim 1, wherein, when the plurality of A-CSI reports to be transmitted on different carriers is triggered by the different DCIs, the processor expects to transmit the plurality of A-CSI reports on the overlapping OFDM symbols.

4. The terminal according to claim 1, wherein the processor controls not to transmit the plurality of A-CSI reports triggered by the different DCI in the same transmission duration in a cell group.

5. A radio communication method for a terminal, comprising:
   receiving a Downlink Control Information (DCI) to trigger an Aperiodic Channel State Information (A-CSI) report; and
   controlling to not transmit a plurality of A-CSI reports in a given transmission duration,
   wherein, when the plurality of A-CSI reports is triggered by different DCIs, the terminal does not expect to transmit, in a single carrier, the plurality of A-CSI reports on overlapping Orthogonal Frequency Division Multiplexing (OFDM) symbols, the plurality of A-CSI reports using a physical uplink shared channel.

6. A base station comprising:
   a transmitter that transmits a Downlink Control Information (DCI) to trigger an Aperiodic Channel State Information (A-CSI) report; and
   a processor that controls triggering of transmission of a plurality of A-CSI reports in a given transmission duration,
   wherein, when the plurality of A-CSI reports is triggered by different DCIs, the processor does not expect to receive, in a single carrier, the plurality of A-CSI reports on overlapping Orthogonal Frequency Division Multiplexing (OFDM) symbols, the plurality of A-CSI reports using a physical uplink shared channel.

7. A system comprising a terminal and a base station, wherein:
   the terminal comprises:
      a receiver that receives a Downlink Control Information (DCI) to trigger an Aperiodic Channel State Information (A-CSI) report; and
      a first processor that controls to not transmit a plurality of A-CSI reports in a given transmission duration,
      wherein, when the plurality of A-CSI reports is triggered by different DCIs, the first processor does not expect to transmit, in a single carrier, the plurality of A-CSI reports on overlapping Orthogonal Frequency Division Multiplexing (OFDM) symbols, the plurality of A-CSI reports using a physical uplink shared channel; and
   the base station comprises:
      a transmitter that transmits the DCI; and
      a second processor that controls triggering of transmission of the plurality of A-CSI reports in the given transmission duration.

* * * * *